(12) United States Patent
Devillez (10) Patent No.: US 12,552,516 B2
(45) Date of Patent: Feb. 17, 2026

(54) ANTIBLOCKING VEHICLE DOOR EDGE PROTECTOR

(71) Applicant: LATECOERE, Toulouse (FR)

(72) Inventor: Sebastien Devillez, Saint Jean (FR)

(73) Assignee: LATECOERE, Toulouse (FR)

( * ) Notice: Subject to any disclaimer, the term of this patent is extended or adjusted under 35 U.S.C. 154(b) by 106 days.

(21) Appl. No.: 18/574,393

(22) PCT Filed: Jun. 16, 2022

(86) PCT No.: PCT/EP2022/066449
§ 371 (c)(1),
(2) Date: Dec. 27, 2023

(87) PCT Pub. No.: WO2023/274740
PCT Pub. Date: Jan. 5, 2023

(65) Prior Publication Data
US 2024/0336346 A1    Oct. 10, 2024

(30) Foreign Application Priority Data
Jun. 28, 2021 (FR) ........................................ 2106953

(51) Int. Cl.
*B64C 1/14*      (2006.01)
(52) U.S. Cl.
CPC .................. *B64C 1/1461* (2013.01)
(58) Field of Classification Search
CPC ................................................... B60R 13/043
See application file for complete search history.

(56) References Cited

U.S. PATENT DOCUMENTS

| 2,997,751 | A | * | 8/1961 | Mcpherren | B64C 1/143 49/248 |
| 3,380,193 | A | * | 4/1968 | Hill | B60R 13/043 293/1 |
| 3,513,595 | A | * | 5/1970 | Mills | B60R 13/043 49/462 |
| 4,679,290 | A | * | 7/1987 | Adell | B60R 13/043 29/458 |
| 4,804,223 | A | * | 2/1989 | Iati | B60R 13/043 49/462 |

(Continued)

FOREIGN PATENT DOCUMENTS

| DE | 102004026294 A1 | * | 12/2000 | ........... B60R 13/043 |
| DE | 202007007826 U1 | * | 8/2007 | ........... B60R 13/043 |

(Continued)

*Primary Examiner* — Catherine A Kelly
(74) *Attorney, Agent, or Firm* — Defillo & Associates, Inc.; Evelyn A. Defillo (57) ABSTRACT

An assembly of a vehicle door (3) and of a panel (1) surrounding the door in which an edge protector (4) extends along a skin (3a) of the vehicle door facing the skin (1a) of the panel and has a portion disposed between the skins (1a, 3a) following when in a nominal position the geometric alignment of their exterior faces. This edge protector (4) has in a median portion (4b) a profile that is adapted to evolve and is made of an elastic material so that it has sufficient flexibility in a direction parallel to the distance between the skins (1a, 3a) and a transverse stiffness in the internal-external direction and its contact with the skin (1a) of the panel does not block opening of the door or damage the skins (1a, 3a).

8 Claims, 5 Drawing Sheets

(56) References Cited

U.S. PATENT DOCUMENTS

| | | | | |
|---|---|---|---|---|
| 5,868,355 | A * | 2/1999 | Carter, Jr. | B63B 19/08 |
| | | | | 244/129.5 |
| 6,622,432 | B2 * | 9/2003 | Zacher | E06B 3/88 |
| | | | | 49/501 |
| 7,086,200 | B2 * | 8/2006 | Rathgeb | B60R 13/043 |
| | | | | 49/462 |
| 7,252,313 | B2 * | 8/2007 | Browne | B62D 39/00 |
| | | | | 293/128 |
| 8,783,750 | B2 * | 7/2014 | Kuwabara | B60R 13/043 |
| | | | | 49/490.1 |
| 10,035,410 | B2 * | 7/2018 | Taketomo | B60J 10/16 |
| 10,668,872 | B2 * | 6/2020 | Wittorf | B60R 13/043 |
| 10,774,578 | B2 * | 9/2020 | Raz | E06B 5/113 |
| 11,203,406 | B2 * | 12/2021 | Hackenberg | B64C 1/1461 |
| 11,208,056 | B2 * | 12/2021 | Hunt | B60R 13/043 |
| 12,179,562 | B2 * | 12/2024 | Baratin | B60R 13/04 |
| 2006/0006286 | A1 | 1/2006 | Eveker | |
| 2006/0234007 | A1 * | 10/2006 | Durand | B64C 1/062 |
| | | | | 428/122 |
| 2013/0075528 | A1 | 3/2013 | Paul | |
| 2014/0020301 | A1 * | 1/2014 | Joubert | B60R 13/043 |
| | | | | 49/462 |
| 2014/0346277 | A1 | 11/2014 | Risch | |
| 2020/0130806 | A1 | 4/2020 | Heeren | |

FOREIGN PATENT DOCUMENTS

| | | | | |
|---|---|---|---|---|
| DE | 202014104256 | U1 * | 9/2014 | B60R 13/043 |
| FR | 2975966 | | 12/2012 | |
| KR | 20140007234 | A * | 1/2014 | B60J 10/86 |

\* cited by examiner

ANTIBLOCKING VEHICLE DOOR EDGE PROTECTOR

CROSS REFERENCE TO RELATED APPLICATION

This application is a national stage entry of PCT/EP2022/066449 filed Jun. 16, 2022, under the International Convention and claiming priority over French Patent Application No. FR2106953 filed Jun. 28, 2021.

TECHNICAL FIELD

The invention relates to an edge protector located at the edge of a door of a vehicle for transporting persons and/or goods enabling prevention of the door jamming at its edge. The present invention relates more particularly to the protection of the door skin edge against the possibility of damage during use of the vehicle. Generally speaking, all vehicles are intended to be equipped with doors of this kind, in particular: aircraft, trains, ships, submarines and any type of vehicle.

In the aeronautical field, the doors are positioned along the fuselage of the aircraft. These doors have two extreme static positions, either closed or open. When closed, they are in continuity with and as close as possible to the skin of the fuselage to reduce aerodynamic disturbances and to minimize the consumption of kerosene. When open, they enable passengers to exit, and during their opening/closing movements they do not cause any contact with the skin of the fuselage so as not to damage it and to preserve the integrity of the aircraft. The positioning of the doors is therefore such that they must be sufficiently close to the skin of the fuselage in the closed position but also have sufficient space to be opened without making contact. Furthermore, minimal clearances are required to enable deformation of the fuselage under flight loads.

PRIOR ART

The doors of vehicles are traditionally made of metal and, especially in the aeronautical field, when the doors are made of metal the edge of the skin of the door is not protected. Indeed, it is possible to repair this edge by a resurfacing or shaping operation because of deterioration occurring between two scheduled maintenance operations. However, in order to avoid such repairs, the absence of protection then implies preventing the skin of the door from coming into contact with the skin of the door frame. This contact may result from deformation of the fuselage and strong vibrations in flight or in the event of a "minor crash" (minor accident). In the latter case an impact between the door and fuselage skins could lead to local binding and prevent opening of the door at least temporarily, which is contrary to air safety rules because it is essential to guarantee that the doors provide their emergency exit function.

To prevent the skins from touching dedicated abutments are installed on interface parts between the door and the fuselage. These centering abutments complement the pressure abutments of the door the role of which is to retain the door in its frame if an outward force is exerted from the interior of the fuselage, as is the case during pressurization of the cabin. Patent documents such as US2013075528 or US2014346277 depict the use of such abutments. Moreover, sealing lips extending between the door and the fuselage are commonly used, as described in the document FR2975966. These lips are generally made of an elastic material, secured to the door and include an antijamming portion.

On the other hand, to guard against the door jamming in the event of a minor crash, usage recommends maintaining a minimal clearance of 2 mm between the centering abutments when installing the door.

A problem linked to these installations is the set of precise adjustments that are necessary to cause contact with the centering abutments before contact with the skins. To circumvent this drawback and to render installation faster it is necessary to increase the nominal clearance of the centering abutments and therefore the clearance between the skins of the door and the fuselage. Now, increasing the distance between the skins is a major disadvantage with regard to the aerodynamics of the aircraft and therefore its use.

Another known type of door is made of composite materials. These doors may be protected by edge protectors arranged on their skin, but these protection parts must also comply with the conditions of non-contact referred to in the case of metal doors.

Furthermore, composite material doors, despite the presence of an edge protector, are subjected to the same installation constraints as metal doors and therefore have the same disadvantages as them of complex and precise adjustments.

SUMMARY OF THE INVENTION

In order to remedy the disadvantages of the prior art the main objective of the invention is to provide a door surround enabling reduction of the gap between the skins of the door and of the fuselage, this edge having the advantage of reducing the precision of the adjustments of the centering abutments when installing the door, accepting contact of the door with the skin of the fuselage without damage, while complying with safety requirements and preserving the possibility of opening the unjammed door in the event of a minor crash.

To this end, the invention equips the edge of the skin of the door with an edge protector making it possible to prevent damaging the skins in the event of contact of the centering abutments whilst preserving the ability to open the door in the event of a minor crash. This edge protector is also rendered sufficiently rigid so as not to deflect significantly because of the pressure difference linked to the flow of air over the fuselage and to maintain aerodynamic performance.

To be more precise, the present invention has for object a protection assembly comprising a vehicle door and a panel surrounding the door, the door and the panel having skins having external faces with the same profile and being aligned when the door is in the closed position, as well as centering abutments facing one another with a predefined clearance. The door is equipped with an antijamming edge protector extending along a door skin perimeter facing the skin of the panel separating an interior and an exterior of the vehicle.

The edge protector is secured to the door and includes an antijamming portion inserted between the skins and in a nominal position following the geometrical alignment of their external face, together with a clearance between an edge face of the protector and an edge face of the skin of the panel less than the clearance between the centering abutments. Furthermore, this protector is made of an elastic material with a profile able to evolve in the antijamming portion and having sufficient flexibility in a direction parallel to the clearance between the skins so that, in the event of a minor accident, the skins remain at a distance greater than a minimum distance of 3 mm if the centering abutments come into contact, while having a transverse rigidity in the internal-external direction limiting deflection of the protector to 2 mm with a pressure difference between the interior and the exterior caused by the aerodynamic airflow of 1 psi (69 mBar).

When this edge protector is in contact with the skin of the panel, the door opens and then closes without damaging the skins of the door and of the panel and without generating excessive force on the handle.

Installing a door including an edge protector according to the invention advantageously reduces the constraints on adjustment of the centering abutments as a function of the clearance between the respective skins of the door and of the panel in which it is installed: indeed, the presence of the edge protector makes it possible to increase the range of clearance at the centering abutments since contact with the skins becomes acceptable. This greater installation tolerance therefore reduces the adjustments required for positioning the centering abutments.

If the clearance range between the centering abutments is maintained, it is also advantageous if the edge protector according to the invention mechanically reduces the gap between the door and the panel, which is also favorable for the aerodynamics of the vehicle in the vicinity of the door without sacrificing the functionality thereof, the door being able to open and close without damaging the skins on contact of the edge protector with the skin of the panel.

By the "gap" between the skins of the door and of the panel is meant the space freed by the offset between those skins. Furthermore, the adjective "transverse" and its derivatives apply to an element passing through the vehicle between the interior and the exterior of the vehicle in a plane perpendicular to the longitudinal axis of the vehicle.

In some preferred embodiments and without this being limiting on the invention:
- a gap is preserved between the edge protector and the facing skin of the panel while externally assuring the geometric continuity between the external faces of the skins so that the edge protector is referred to as open under nominal door closure conditions;
- the edge protector may be installed on the entire perimeter of the door, on a portion of or on a plurality of portions of that perimeter;
- the edge protector is made of a hyper-elastic material chosen from polyurethane, rubber and silicone;
- the edge protector includes an active stiffness and/or length variation system chosen from an inflatable seal at the edge of the protector, an electro-active polymer constituent material, a shape memory material and a piezo-electric effect system; an active system of this kind enables breaking up of ice that may form between the skins in flight;
- the edge protector includes on one of its edges a flat for fixing it to an internal face of the skin of the door inside the vehicle;
- a door closure seal is mounted on the fixing flat when the door is closed;
- the edge protector includes a lip formed on its other edge that extends transversely inward;
- the edge protector includes an antifriction exterior coating; indeed, a coating of this kind limits friction with the external air but also in the event of contact with the skin of the panel, which results in improved durability of the edge protector and reduces the opening force in the event of a minor crash; and the edge protector may combine a hyper-elastic material with an active system.

The edge protector has a number of advantages in the case of an aircraft. Its open internal profile is favorable in particular to the evacuation of water. If water is not evacuated it solidifies at the extreme outside temperatures during flight phases and expands as it freezes, which can damage the skins of the door and of the panel.

Furthermore, the profile adapted to evolve contributes to the open design. It also offers a great possibility of deformation in the direction perpendicular to the edge of the skin cut-out and assures a stiffness in the direction of thickness of the skins. This flexibility in the direction of the skins makes it possible to preserve the integrity of the skins and to maintain the functioning of the door in the event of contact between the skin of the panel and the edge protector. The lip also protects the cavity of the door closure seal from the aerodynamic airflow, which enables prevention of aerodynamic disturbances.

BRIEF DESCRIPTION OF THE FIGURES

Other features and advantages of the present invention will emerge from the following description of one embodiment thereof, without limiting the scope thereof, given with reference to the appended figures, which represent.

DETAILED DESCRIPTION OF THE INVENTION

Figure 1:
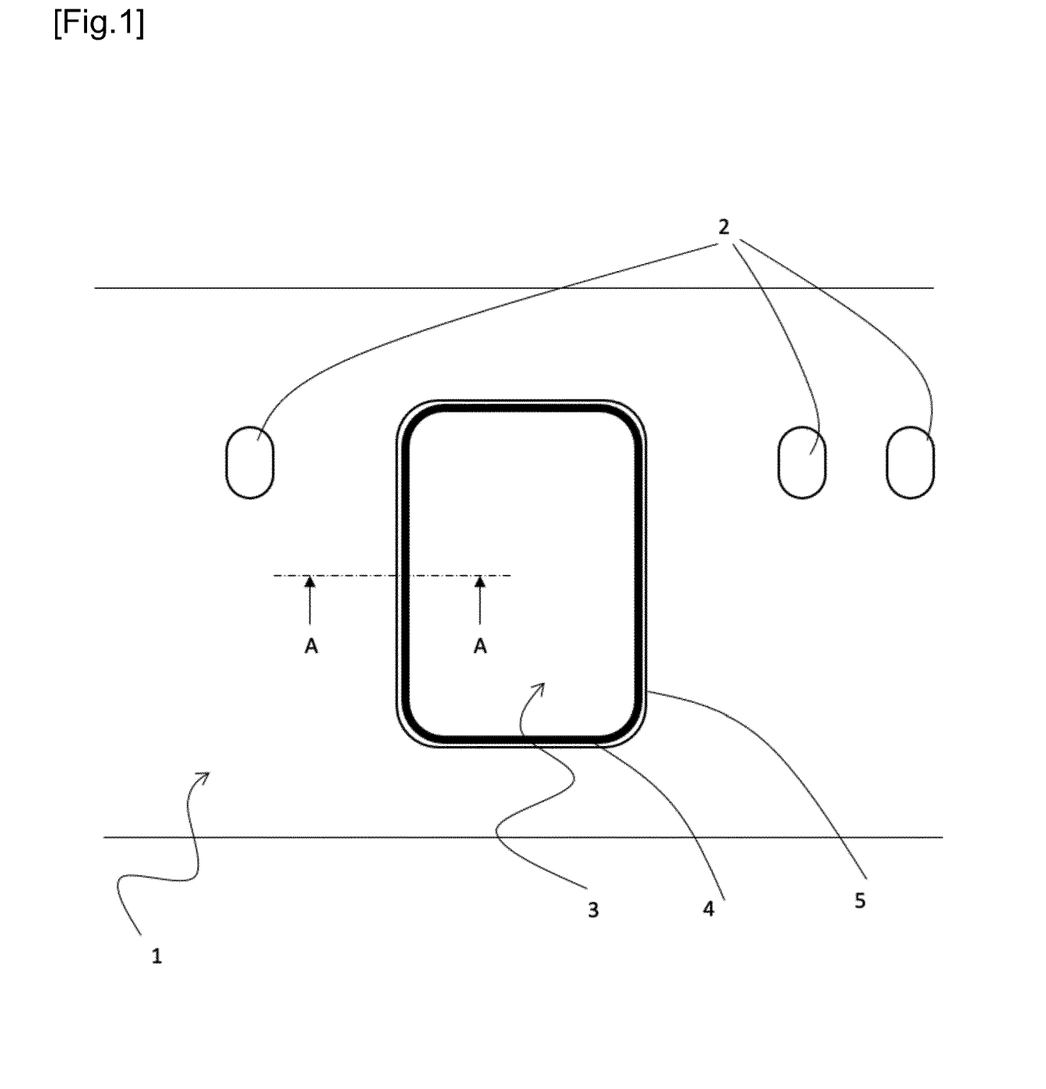
FIG. 1, a lateral view of an aircraft with windows and a door in the closed position (nominal configuration), FIG. 2, a view in section on the interface between the door and the fuselage panel in the nominal position, FIG. 3, a view in section of the interface between the door and the panel in the event of an impact between the door and the panel, FIG. 4, a view in section of the interface between the door and the panel during opening of the door following that contact, and FIG. 5, a view in section of the interface between the door and the panel when opening the door, the door no longer being in contact with the fuselage.

FIG. 1 represents a lateral view of an aircraft depicting a panel 1, windows 2 and a door 3 in the closed position with its edge extending over its perimeter. In this example the panel 1 is a portion of a section of the fuselage of the aircraft and the door 3 is a door representative of classic aircraft doors, a passenger door in this example, but the invention applies equally to aircraft emergency doors. A door opening 5 is made in the panel 1 to receive the door 3 equipped with its edge protector 4. In this embodiment the edge protector 4 extends all around the door 3, but it could be present only on one or more portions of the perimeter of the door 3.

Figure 2:
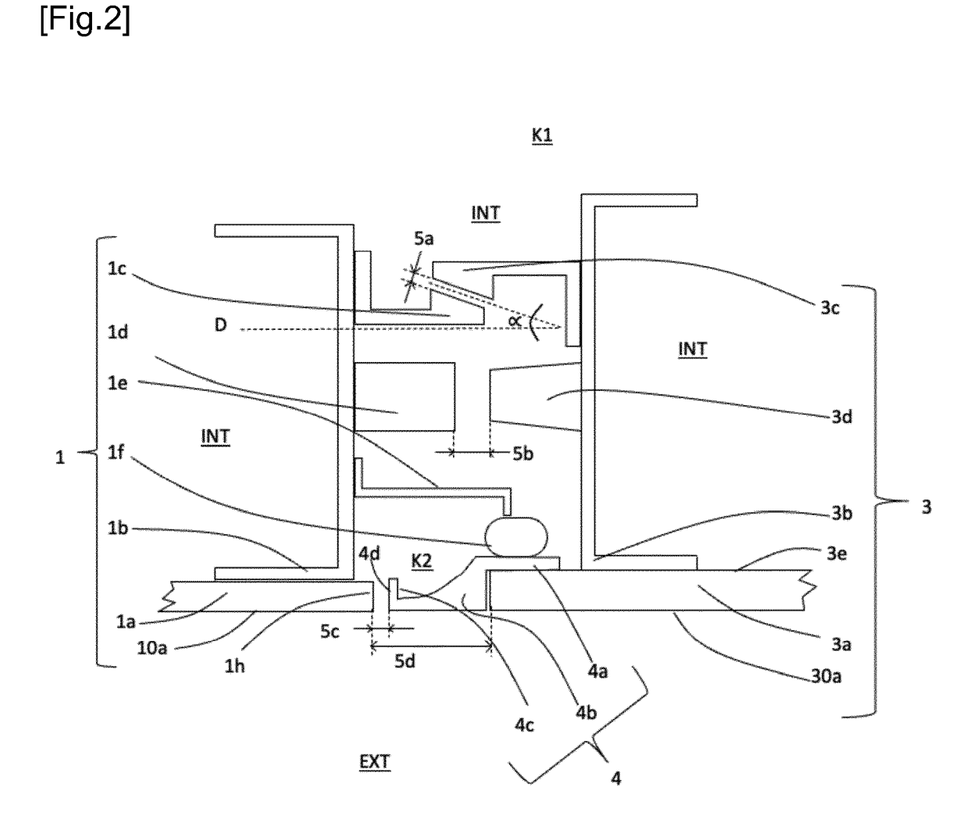
Figure 3:
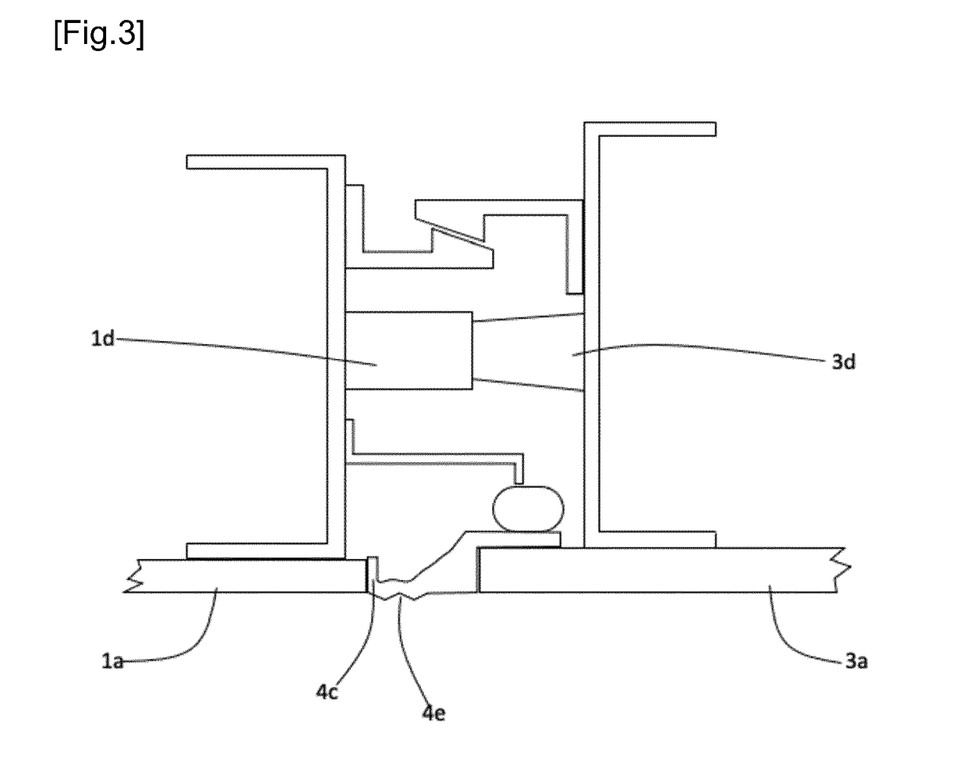
Figure 4:
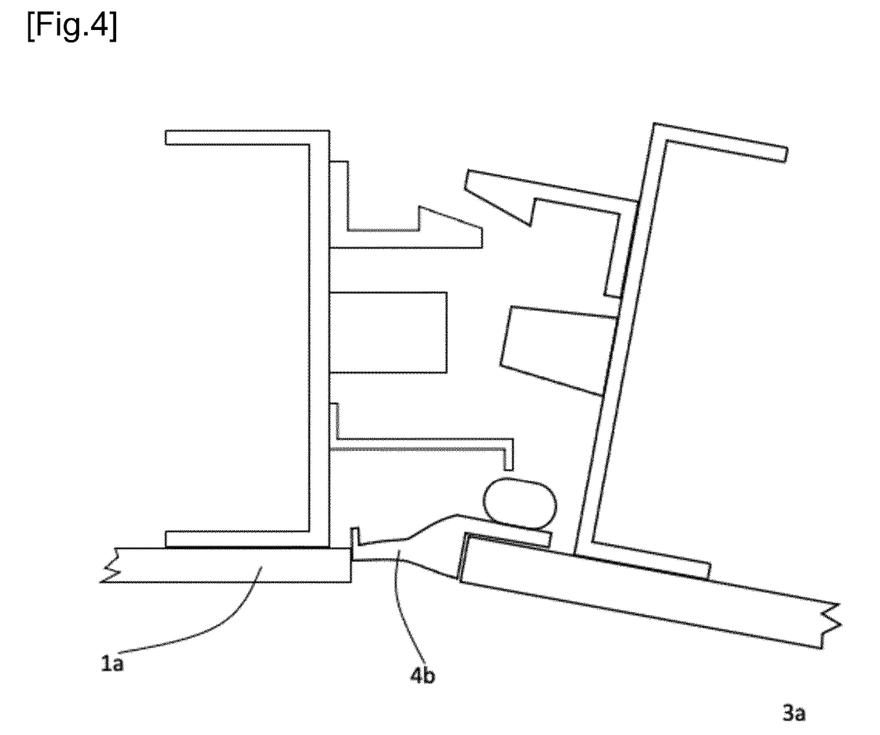
Figure 5:
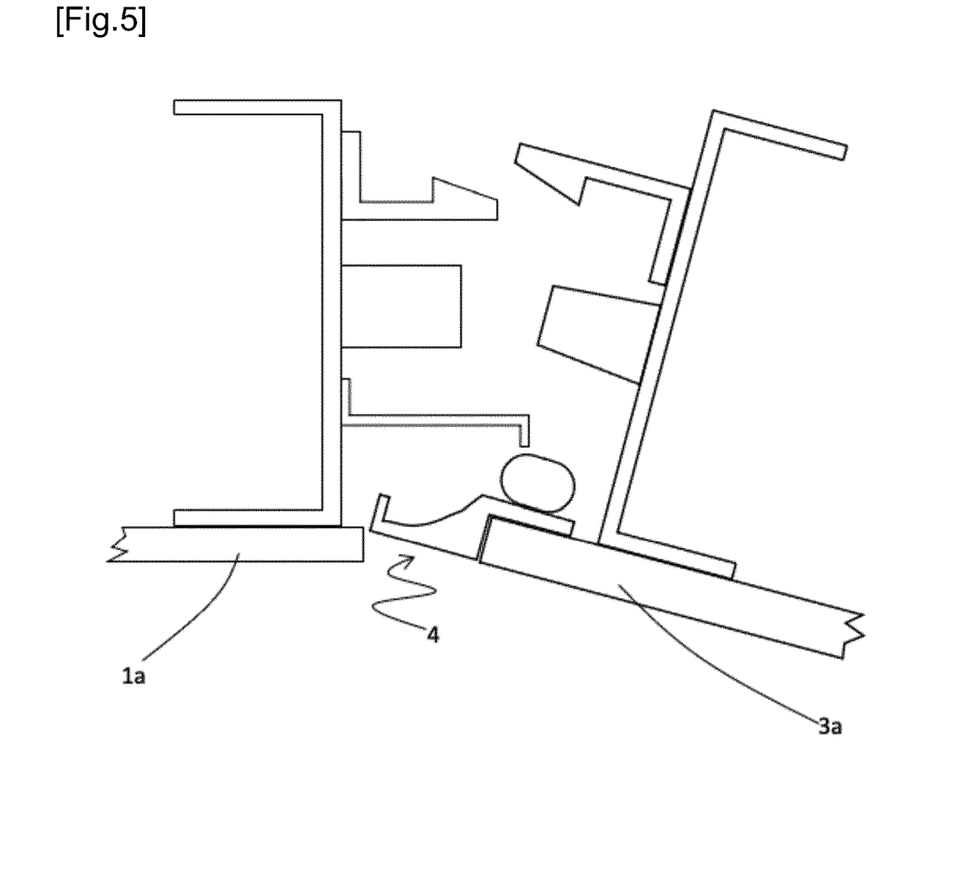

A section plane A-A orthogonal to the FIG. 1 lateral view enables depiction of the features of the border of the door in FIG. 2, the door being closed in FIG. 3, and then, in the event of an impact or a minor crash, during opening of the door after a minor crash in FIG. 4 and FIG. 5.

The FIG. 2 sectional view shows more precisely the elements constituting the interface between the panel 1 and the door 3 in the closed position (nominal configuration). The panel 1 includes a skin 1*a* and a frame 1*b*. The panel skin 1*a* forms a partition separating an interior space INT and an exterior space EXT of the aircraft. The panel frame 1*b* is mounted on and bears on the panel skin 1*a* and supports pressure abutments 1*c* and centering abutments 1*d*, as well as a seat 1*e* on which the seal 1*f* bears upon closing the door 3. In an equivalent manner the door 3 includes a skin 3*a* and a frame 3b, the skin 3a of the door also forming a partition between the interior space INT of the aircraft opening into the cabin K1 in this example and the exterior space EXT outside the aircraft. The external faces 10a and 30a of the skins 1a and 3a, respectively, have the same profile and are aligned when the door 3 is in the closed position. For its part the door frame 3b is mounted on and bears on the skin 3a of the door and supports pressure abutments 3c and centering abutments 3d. The seal 1f is mounted on the edge protector 4 in this embodiment or on the internal surface 3e of the skin of the door.

The pressure abutments 1c and 3c are disposed face to face with an angle of inclination $\propto$, which may be zero, relative to the direction "D" of the skin in the plane A-A. These pressure abutments 1c and 3c hold the door 3 closed, thus with a zero clearance 5a, throughout the duration of the flight. As for the centering abutments 1d and 3d, they are disposed face to face in the direction "D" with a predefined clearance 5b. The role of the centering abutments 1d and 3d is to prevent the skins 1a and 3a from touching but also to guarantee the positions of the pressure abutments.

The edge protector 4 in accordance with this embodiment, secured to the door 3 and extending parallel to and in line with the door skin 3a, includes three sections: a fixing flat 4a, a median portion 4b and an edge lip 4c. It is molded with a profile that is able to evolve from a material exhibiting elastic-type deformation, a polyurethane in this example, or, more generally and preferably, a hyper-elastic material.

On an edge portion of the protector 4, on the side of the door 3, the fixing flat 4a is riveted to the internal face 3e of the door skin 3a, inside the vehicle. At the other edge of the protector 4, on the panel 1 side, the edge lip 4c extends transversely toward the interior of the aircraft in order to prevent any aerodynamic disturbance in the internal cavity K2 limited by the door closure seal 1f and the exterior EXT.

In the median position between the lip 4c and the flat 4a the median portion 4b lies between the skins 1a and 3a, following externally the geometric alignment of their external faces 10a and 30a when the door 3 is closed. The median portion 4b increases in thickness from its edge lip 4c as far as the flat 4a, defining the profile adapted to evolve of this embodiment in an exponentially increasing type curve in this embodiment. A clearance 5c is defined between the face 4d of the lip 4c facing the transverse edge face 1h of the panel skin 1a, this clearance 5c being less than the clearance 5b between the centering abutments 1d and 3d—75% lower in this embodiment.

Under normal door closure conditions this clearance 5c maintains a gap between the edge protector 4 and the facing skin of the panel 1a, while assuring externally the geometric continuity between the exterior faces of the skins 1a and 3a: the edge protector 4 is then said to be "open", that is to say it allows the circulation of a fluid in the cavity K2. Furthermore, the rigidity of the edge protector 4 in the internal-external transverse direction limits the deflection of the protector to a value less than about 2 mm under an aerodynamic pressure of 1 psi (69 mBar), this deflection resulting from the mechanical properties of the elastic material used combined with the profile adapted to evolve of its median portion 4b.

The FIG. 3 sectional view depicts the result of an impact between the edge protector 4 and the skin 1a of the panel in the event of movement of the door 3 caused by vibration or a minor crash. In particular, the material constituting the edge protector 4 has sufficient flexibility in the direction D parallel to the clearance 5d between the skins 1a and 3a to enable it to deform elastically, the skins therefore remaining at a distance greater than a minimum distance when the centering abutments 1d and 3d come into contact. The deformation 4e, although including a discontinuity in the aerodynamic line of the aircraft, produces less disturbance than a gap between the skins 1a and 3a and is also of short duration and therefore insignificant for the fuel consumption of the aircraft.

When the vibration movement ends, the door 3 moves to return to a nominal position as depicted in FIG. 2 in which the centering abutments 1d and 3d are no longer in contact and the elastic properties of the edge protector 4 return the protector to its nominal length.

The edge protector 4 is subjected to friction forces from the external air and during its contact with the skin 1a of the panel. These friction forces lead to wear of the edge protector 4: in order to enhance the durability thereof and to complement the properties of the hyper-elastic material, in this example it includes an exterior antifriction coating (not represented) on its external surfaces. This antifriction coating also serves to reduce the opening forces in the event of a minor crash.

During opening in the event of a minor crash the edge protector 4 rubs on the fuselage panel 1a. Sliding on the fuselage panel 1a, the shape and the material of the edge protector 4 then enable opening conforming to the requirements in respect of the force on the handle of the door (not represented).

FIG. 4 and FIG. 5 depict a breakdown of the behavior of the edge protector 4 during opening of the door 3 following an impact between the skin of the panel 1a and the edge protector 4, in particular in the event of a minor crash.

When the door is more widely open (FIG. 5) the edge protector 4 is moved away from the skin of the panel 1a: the transverse rigidity and the elasticity of the edge protector 4 enable it to return to its nominal orientation and length relative to the skin of the door 3a.

In the context of the invention the edge protector 4 and the clearance 5c occupy the space defined by the distance 5d (cf. FIG. 2) between the skins 1a and 3a. With no edge protector 4 this distance 5d is close to the clearance 5c, which requires iterative phases of precise adjustment in order to position the door 3 at a minimum distance from the panel 1 enabling it to be opened without contact between the skins 1a and 3a. The invention therefore makes it possible to dispense with adjustment steps of this kind, contact between the edge protector 4 and the skin of the panel 1a also being possible without impeding the opening of the door 3.

The foregoing figures depict an edge protector 4 of passive type, the function of which is linked to the intrinsic mechanical properties of the type of material of the protector and the profile adapted to evolve. Another type of solution included in the field of protection of the present invention gives preference to an edge protector 4 of active type, mechanical properties of which are activated by an external control device, such as an active system for variation of stiffness and/or length of an inflatable seal at the edge of the edge protector 4. Other active materials or systems may be used: an electro-active polymer material, a shape memory material or a piezo-electric effect system.

These active systems offer precise and adaptive control of the behavior of the edge protector 4: two of these active systems may also be used in combination, one more particularly dedicated to longitudinal elasticity and the other dedicated to transverse stiffness. Another advantage of an active system is to be able to propose de-icing and breaking up of ice that may form between the skins 1a and 3a in flight.

An active system may also be combined with a passive system in order to complement it and to reinforce its mechanical properties.

The edge protector 4 may also be obtained by means other than molding, such as by machining or by 3D printing.

The invention claimed is:

1. A door (3), panel (1) protection assembly comprising:
a vehicle door (3) and a panel (1) surrounding the door (3), the door (3) having a skin (3a) with external faces and the panel (1) having a skin (1a) including external faces, the external faces of the door and the external faces of the panel have a same profile that are aligned when the door (3) is in a closed position, the door (3) having a centering abutment (3d) and the panel (1) having a centering abutment (1d), the abutments face each other with a predefined clearance, the door (3) having an edge protector (4), the edge protector:
extends along a perimeter of the door skin (3a) facing the panel skin (1a) separating an interior (INT) and an exterior (EXT) of the vehicle,
includes an anti jamming portion disposed between the skins (1a, 3a) in a geometrical alignment position of the respective exterior faces, and
is made of an elastic material with a profile adapted to evolve in the anti-jamming portion having sufficient flexibility in a direction parallel to the clearance between the skins (1a, 3a),
the edge protector (4) has a clearance (5c) between an edge face of the edge protector and an edge face of the skin of the panel (1a) less than the clearance (5b) between the centering abutments (1d, 3d),
wherein in the event of a minor accident, the skins (1a, 3a) remain at a distance from each other greater than a minimum distance when the centering abutments (1d, 3d) come into contact while having a transverse rigidity in the internal-external direction limiting deflection of this edge protector (4) to less than or equal to 2 mm under a local external aerodynamic pressure of 1 psi (69 mBar),
wherein the clearance (5c) is ≤75% of the clearance (5b) between the centering abutments (1d, 3d).

2. The door (3), panel (1) protection assembly as claimed in claim 1, wherein a gap is preserved between the edge protector (4) and the facing skin of the panel (1a) while externally assuring the geometric continuity between the external faces (10a, 30a) of the skins (1a, 3a) so that the edge protector (4) is referred to as open under nominal door closure conditions.

3. The door (3), panel (1) protection assembly as claimed in claim 1, wherein the edge protector (4) is installed on an entire perimeter of the door (3), on a portion of or on a plurality of portions of the perimeter.

4. The door (3), panel (1) protection assembly as claimed in claim 1, wherein the edge protector (4) is made of a hyper-elastic material chosen from rubber or silicone.

5. The door (3), panel (1) protection assembly as claimed in claim 1, wherein the edge protector (4) includes on one edge a flat (4a) for fixing it to an internal face of the skin of the door (3a) inside the vehicle.

6. The door (3), panel (1) protection assembly as claimed in claim 5, wherein a door closure seal (1f) is mounted on the fixing flat (4a) when the door (3) is closed.

7. The door (3), panel (1) protection assembly as claimed in claim 5, wherein the edge protector (4) includes a lip (4c) formed on another edge that extends transversely inward.

8. The door (3), panel (1) protection assembly as claimed in claim 1, wherein the edge protector (4) includes an exterior antifriction coating.

* * * * *